US008853815B1

(12) United States Patent
Ranganathan et al.

(10) Patent No.: US 8,853,815 B1
(45) Date of Patent: Oct. 7, 2014

(54) METHODS AND APPARATUS FOR CONGESTION-AWARE BUFFERING USING VOLTAGE ISOLATION PATHWAYS FOR INTEGRATED CIRCUIT DESIGNS WITH MULTI-POWER DOMAINS

(71) Applicant: QUALCOMM Incorporated, San Diego, CA (US)

(72) Inventors: Sundararajan Ranganathan, Encinitas, CA (US); Paras Gupta, San Diego, CA (US); Raghavendra Dasegowda, San Diego, CA (US); Rajesh Verma, San Diego, CA (US); Parissa Najdesamii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 13/831,360

(22) Filed: Mar. 14, 2013

(51) Int. Cl.
*H01L 29/00* (2006.01)
*H01L 21/82* (2006.01)
*G06F 17/50* (2006.01)
*H01L 29/06* (2006.01)

(52) U.S. Cl.
CPC ........ *G06F 17/5077* (2013.01); *H01L 29/0657* (2013.01)
USPC ........... 257/499; 257/629; 257/664; 257/798; 257/E21.01; 257/E27.105; 438/128; 438/129; 438/130; 716/110; 716/114

(58) Field of Classification Search
USPC .................... 257/499, 629, 664, 798, E21.01, 257/E27.105; 438/128, 129, 130; 716/110, 716/114
See application file for complete search history.

(56) References Cited

U.S. PATENT DOCUMENTS

| 6,505,336 | B1 | 1/2003 | Andreev et al. |
| 6,515,501 | B2 | 2/2003 | Bosnyak et al. |
| 6,532,580 | B1 | 3/2003 | Josephson et al. |
| 6,615,401 | B1 | 9/2003 | Gasanov et al. |
| 6,651,236 | B2 | 11/2003 | Ichimiya et al. |
| 6,826,740 | B2 * | 11/2004 | Drumm .......... 716/114 |
| 6,910,197 | B2 | 6/2005 | Nair |
| 7,948,292 | B1 | 5/2011 | Chiu et al. |
| 2006/0291110 | A1 | 12/2006 | Kanno et al. |
| 2007/0283310 | A1 | 12/2007 | Hiraga |

OTHER PUBLICATIONS

International Search Report and Written Opinion for PCT/US2014/022726—ISA/EPO dated May 30, 2014.

* cited by examiner

*Primary Examiner* — Thanh V Pham
(74) *Attorney, Agent, or Firm* — Haynes and Boone, LLP

(57) ABSTRACT

A semiconductor apparatus is provided herein for buffering of nets routed through one or more areas associated with a first power domain that is different from a second power domain associated with the buffers and the buffered nets by limiting placement of these buffers in patterned areas associated with the second power domain. This provides for the routing of the buffered nets to be determined not only based on the shortest distance to travel from Point A to Point B, but also takes into account routing congestion on the semiconductor apparatus. Consequently, if an area on the semiconductor apparatus is congested, the buffered nets may be routed around the congestion. As such, although a path taken by a particular signal through the integrated circuit is not a direct route, it may still be of a distance to support a speed at which the particular signal needs to be transferred.

31 Claims, 6 Drawing Sheets

METHODS AND APPARATUS FOR CONGESTION-AWARE BUFFERING USING VOLTAGE ISOLATION PATHWAYS FOR INTEGRATED CIRCUIT DESIGNS WITH MULTI-POWER DOMAINS

FIELD

The present disclosure pertains to integrated circuit design and layout. Specifically, the present disclosure is directed to semiconductor apparatuses having more than one power domain and that are capable of buffering signals in a semiconductor apparatus using voltage isolation.

BACKGROUND

Semi-conductor apparatuses, such as integrated circuits, are constructed from electronic components formed on semiconductor materials and interconnected with circuit wiring. A network of these circuit wirings may connect a group of components and provide the components with power at a particular voltage level. An integrated circuit may have more than one group of components, where each group of components is designed to operate at a different voltage level. For example, a first group of components may be designed to operate at a first voltage level, and a second group of components may be designed to operate at a second, different voltage level. Integrated circuits that are designed with groups of components operating at more than one voltage level are said to have multiple power domains, where each power domain is associated with a particular voltage level. In operation, a particular power domain may be selectively powered up or down by controlling power to the network of circuit wirings connecting the group of components in that power domain.

The network of circuit wirings described above may be formed during a typical integrated circuit manufacturing process, where conductive material is deposited in a pattern onto a surface of a semiconductor material to electrically connect components such as circuit elements formed using the semiconductor material. Multiple layers of these patterns of conductive material, referred to as "metal layers," are often required to connect all pins of the circuit elements.

Before any integrated circuit can be manufactured, a layout of the integrated circuit must be created. Typically, an algorithm in a software program referred to as a router is used to create the layout. The layout also includes placement information for each component in the integrated circuit in addition to their respective interconnecting nets. In operation, the router is provided with a set of pins that are the input/output for the components, where each pin is associated with a net. The task of the router is to then plan the routing of the network of circuit wirings that will be deposited during manufacturing so that pins for components associated with the same net and power domain can be electrically linked.

As the amount of functionality demanded of integrated circuits used in modern devices such as smart phones continues to increase, designers are challenged to ensure that a layout that includes placement of all components and routing of all nets will obey manufacturing and design rules and constraints. One such constraint is related to a minimal distance a signal may travel before it deteriorates. For example, a signal originating at one location of an integrated circuit may need to be propagated along a net that has been routed across the integrated circuit. Typically, the propagation is achieved by using buffer circuits to receive and regenerate the signal at various locations along that net. In terms of functionality, the buffer circuit referred to herein may be thought of as a repeater because the buffer circuit is configured to regenerate a received signal that may have deteriorated because of the distance it has traveled before reaching the buffer circuit. Without buffering, the signal may only be able to travel a portion of the net because of degradation.

An issue that arises in multi-power domain integrated circuit designs is the buffering of nets that must be routed through an area having circuit elements belonging to a first power domain, where the nets to be buffered belong to a second, and different power domain. The nets may need to be so routed because of timing, transition and wire length constraints demanding a shortest path through a particular region of the integrated circuit. These nets can be buffered by placement of second power domain buffers in the area of the first power domain. However, routing congestion is significantly increased because the circuitry needed to power these buffers at the second power domain are routed in the same area needed for routing of circuitry associated with the first power domain. Furthermore, it is very difficult to allocate and use resources efficiently in this approach.

Accordingly, there is a need for an approach of buffering nets that belong to a second voltage or power domain in co-existence with circuit blocks operating at a first voltage or power domain in order to meet time, transition and wire length requirements for signals traveling over these nets as well as preventing routing congestion due to buffering requirements.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, a semiconductor apparatus for buffering signals in a semiconductor apparatus using voltage isolation is provided. The semiconductor apparatus may comprise an arrangement of semiconductor devices located on a surface of semiconductor material. Each semiconductor device in the arrangement of semiconductor devices is associated with a first power domain. The semiconductor apparatus may also comprise at least one voltage pathway defined on the surface of the semiconductor material that divides the arrangement of semiconductor devices into one or more groups. The at least one voltage pathway may comprise one or more areas reserved on the surface for placement of one or more circuits associated with a second power domain that is different from and independent of the first power domain. The location of the at least one voltage pathway may be pre-defined during a placement of the one or more circuits of the second power domain and the one or more circuits may comprise a set of buffers. The semiconductor apparatus may further comprise one or more deposited networks of conductive material configured to electrically connect at least one circuit element to at least one other circuit element, the at least one circuit element located in a first voltage pathway of the at least one voltage pathway and the at least one other circuit element located in a second voltage pathway in the at least one voltage pathway.

The one or more areas of the at least one voltage pathway that are reserved on the surface for placement of the one or more circuits associated with the second power domain may comprise a pre-defined pattern. The pre-defined pattern may comprise a geometric configuration, such as a checkerboard pattern.

Additionally, the one or more deposited networks of conductive material may traverse any portion of the surface of the semiconductor material while the one or more circuits are only located in the at least one voltage pathway. The arrangement of semiconductor devices may be located on any unused areas of the at least one voltage pathways and the one or more circuits may be located at an intersection of the one or more deposited networks of conductive material and the at least one voltage pathway.

In another aspect, a method for buffering signals in a semiconductor apparatus using voltage isolation is provided. The method may include providing a first power domain to an arrangement of semiconductor devices located on a surface of a semiconductor material within the semiconductor apparatus; providing a second power domain to at least one voltage pathway, the at least one voltage pathway dividing the arrangement of semiconductor devices into one or more groups and comprising one or more circuits, and where the first power domain is different than the second power domain; and electrically connecting at least one circuit element to at least one other circuit element with one or more deposited networks of conductive material, the at least one circuit element located in a first voltage pathway of the at least one voltage pathway and the at least one other circuit element located in a second voltage pathway in the at least one voltage pathway.

In yet another aspect, a semiconductor apparatus that includes means for buffering signals in a semiconductor apparatus using voltage isolation is provided. The semiconductor apparatus may include means for providing a first power domain to an arrangement of semiconductor devices located on a surface of a semiconductor material within the semiconductor apparatus; means for providing a second power domain to at least one voltage pathway, the at least one voltage pathway divides the arrangement of semiconductor devices into one or more groups and comprises one or more circuits, and where the first power domain is different than the second power domain; and means for electrically connecting at least one circuit element to at least one other circuit element with one or more deposited networks of conductive material, the at least one circuit element located in a first voltage pathway of the at least one voltage pathway and the at least one other circuit element located in a second voltage pathway in the at least one voltage pathway.

In yet another aspect, a method for buffering signals in a semiconductor apparatus using voltage isolation is provided. The method may include arranging an arrangement of semiconductor devices on a surface of a semiconductor material within the semiconductor apparatus, where each semiconductor device in the arrangement of semiconductor devices is configured to perform a particular function; determining placement of at least one voltage pathway on the surface of the semiconductor materials that divides the arrangement of semiconductor devices into one or more groups, where the at least one voltage pathway comprises one or more areas reserved on the surface for placement of one or more circuits; routing one or more networks of conductive material configured to electrically connect at least one circuit element to at least one other circuit element, the at least one circuit element and the at least one other circuit element located in the one or more groups; determining placement of the one or more circuits on the at least one voltage pathway; connecting the one or more groups to a first power domain; and connecting the at least one voltage pathway to a second power domain, where the second power domain is different than the first power domain.

Determining the placement of the one or more circuits on the at least one voltage pathway may comprise determining locations where the one or more networks of conductive material intersect over the at least on voltage pathway; determining if a signal strength at the locations of intersection are degrading; and placing the one or more circuits at any of the locations of intersection where the signal strength is degrading.

These and other aspects of the disclosure will become more fully understood upon a review of the detailed description, which follows.

DRAWINGS

Various features, nature and advantages may become apparent from the detailed description set forth below when taken in conjunction with the drawings in which like reference characters identify correspondingly throughout.

DESCRIPTION

Figure 1:
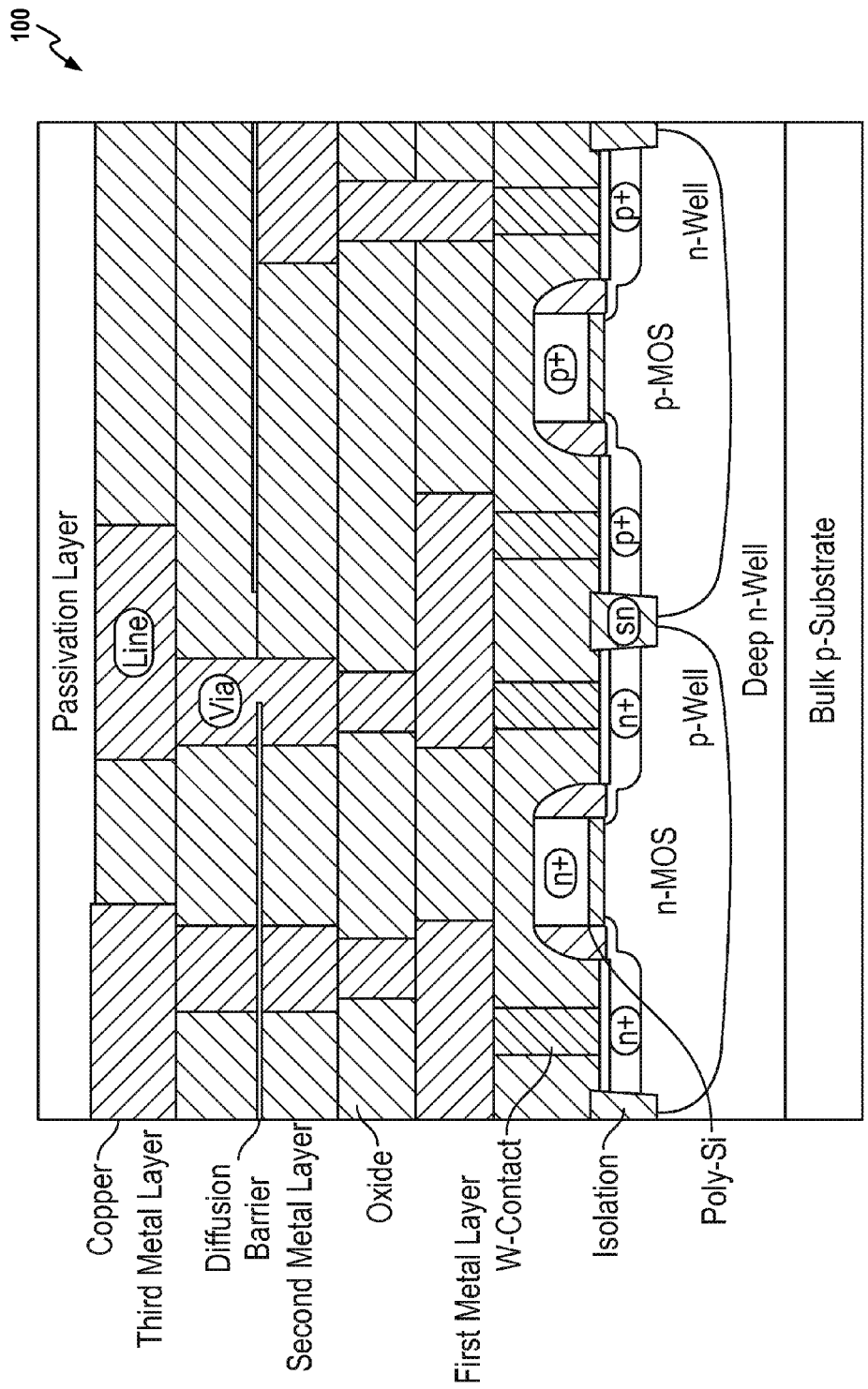
FIG. 1 illustrates a cross-sectional view of a typical complementary metal-oxide-semiconductor (CMOS) integrated circuit having an interconnect structure of three metal layers.

Various aspects of a congestion-aware buffering approach for a semiconductor device with multiple voltage or power domains, such as first and second power domains, are disclosed herein to support transmission of signals on nets associated with the second power domain that are routed over the first power domain by providing buffers located in reserved areas of the first power domain. These reserved areas are associated with the second power domain. In one aspect of the disclosed approach, the congestion-aware buffering approach seeks to meet time, transition and wire length requirements for signals transmitted on the nets associated with the second power domain by buffering those nets. The congestion-aware buffering approach may support buffering those nets while also preventing routing congestion after buffering.

Although two different power domains are being used as an example in this disclosure, it should not be limiting and the same concepts may be applied to other scenarios where groups of components have different electrical requirements, such as where groups of components are associated with different power domains. Additionally, although the disclosed approach is described as having a first power domain and a second power domain, this is by way of example only and additional power domains may be utilized, i.e. a third power domain, a fourth power domain, etc.

In the following description, certain terminology is used to describe certain features of one or more embodiments of the disclosed approach. The term "net" refers to a proposed routing of conductive material, such as wiring, on a surface of a semiconductor material. Nets may be determined by the routing software noted above. The terminology "portions associated with a first power domain" refers to areas on the surface of the semiconductor material associated with devices powered by a first power domain (e.g. video core devices). The terminology "pathways associated with a second power domain" refers to areas in the surface of the semiconductor material in which buffers may be placed to buffer a signal belonging to a second, different power domain. The terminology "net associated with a first power domain" refers to a network of conductive material, such as wiring, for connecting devices belong to the first power domain. The terminology "net associated with a second power domain" refers to a network of conductive material, such as wiring, for a signal that may be buffered in a voltage pathway.

Semiconductor apparatuses may include integrated circuits or semiconductor devices that may be supplied with more than one power domain. These semiconductor apparatuses are said to have more than one power domain, where each power domain is associated with the voltage level provided by its associated voltage net. In some aspects of the disclosed approach, saving power on the apparatus containing the integrated circuit or semiconductor device is desired. For example, if the device is a mobile phone and an individual is talking on the mobile phone, a video core providing video functionality for the mobile phone does not need to be powered while the individual is talking and may be powered down. However, the video core of the apparatus may have other nets passing through it that are unrelated to the video core. Signals on these nets that are unrelated to—but pass through the video core—need to be buffered to ensure proper signal propagation.

Various aspects of the disclosed approach provide for buffering of nets that are routed through one or more areas associated with a first power domain that is different from a second power domain associated with the buffers and the buffered nets by limiting placement of these buffers in patterned areas associated with the second power domain. This provides for the routing of the buffered nets to be determined not only based on the shortest distance to travel from Point A to Point B, but also takes into account routing congestion on the semiconductor apparatus. Consequently, if an area on the semiconductor apparatus is congested, the buffered nets may be routed around the congestion. As such, although a path taken by a particular signal through the integrated circuit is not a direct route, it may still be of a distance to support a speed at which the particular signal needs to be transferred.

Typical Integrated Circuit Manufacturing Process

An integrated circuit comprises a set of electronic circuits on a small plate ("chip") of semiconductor material. A complementary metal-oxide-semiconductor (CMOS) integrated circuit refers to both a particular style of digital circuitry design and the processes used to implement that circuitry on integrated circuits (chips). The fabrication of an integrated circuit using the CMOS process comprises several basic process steps. These steps, a brief overview of which is described below, include lithography, deposition, etching, chemical mechanical polishing, oxidation, ion implantation and diffusion.

First, lithography is used to transfer layout information for the integrated circuit to a wafer or substrate, for example, a photo mask can define the source/drain areas for n-MOS transistors. Ultraviolet light is then typically applied to project the patterns defined by the mask to the photoresist layer which has been deposited on the wafer surface. Next, deposition is used to deposit layers of various materials (semiconductors, metals, insulators, photoresist) on the surface for the wafer or substrate. Deposition processes can include Physical Vapor Deposition (PVD) and Chemical Vapor Deposition (CVD).

After deposition, etching processes are used to either remove complete material layers or transfer the patterns in the photoresist layer (generated by a lithography step) into the underlying layer. The etching can be performed by wet etching, by dry etching, or by a combination of both.

A non-planar surface is produced by process steps which modify the topography of the wafer (deposition, etching, oxidation) and Chemical Mechanical Polishing (CMP) is performed for planarization of the non-planar surface.

For ion implantation processes, silicon dioxide is used for isolation purposes in devices and integrated circuits (e.g. shallow trench isolations between MOS transistors) and as mask or scattering layers. There are two silicon dioxide growth methods, dry and wet oxidation, depending on whether oxygen or water vapor is used. Impurities (dopant atoms) are introduced into semiconductors using ion implantation and an ion implanter is used to accelerate the dopant ions to high energies and to direct the beam of ions onto the wafer.

During any thermal processing step, dopant diffusion occurs either as an intended or unwanted effect. Due to the requirement of very shallow junctions in advanced devices, rapid thermal annealing (RTA) processes with very little diffusion (e.g. flash-assisted RTA or laser-anneal) are used to repair the ion implantation induced damage in the crystal.

An example of the final result of the basic process steps is shown in FIG. 1 which illustrates a cross-sectional view of a typical complementary metal-oxide-semiconductor (CMOS) integrated circuit 100 having an interconnect structure of three metal layers.

Semiconductor Apparatus Surface

Figure 2A:
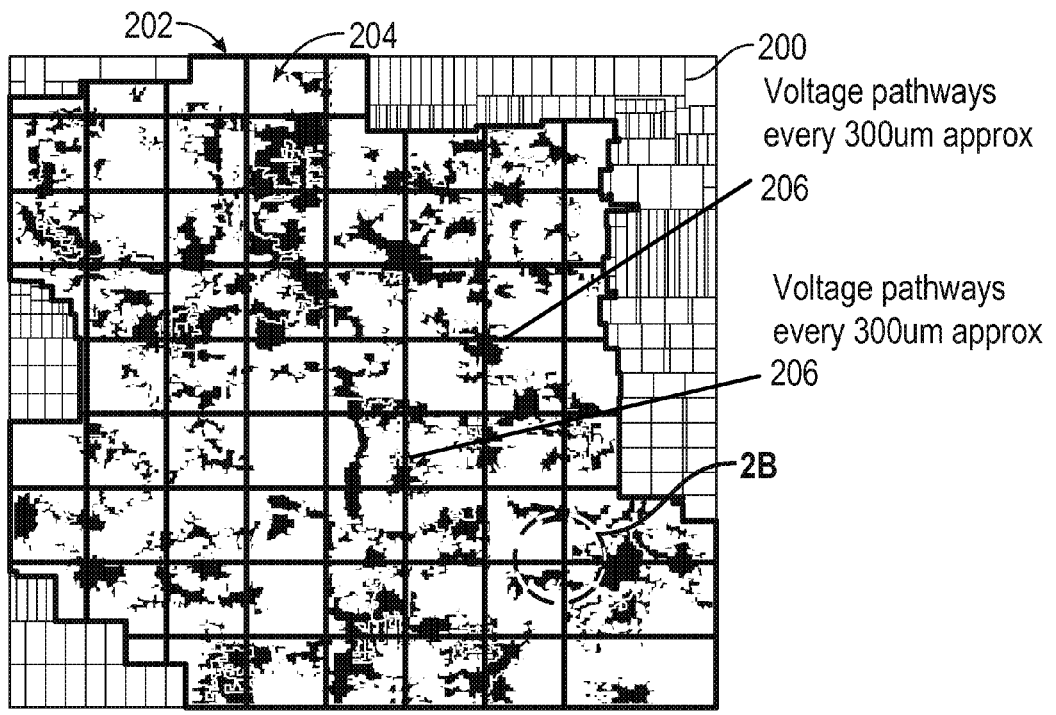
FIG. 2A illustrates a top view of a surface of a semiconductor apparatus configured in accordance with one aspect of the disclosed approach.

FIG. 2A illustrates a top view of a surface 200 of a semiconductor apparatus configured in accordance with one aspect of the disclosed approach. As shown, the apparatus 200 may include an arrangement of semiconductor devices 202. Each semiconductor device 204 in the arrangement of semiconductor devices 202 may include various patterns of semiconductor material (illustrated in black) that are configured to provide a particular function, such as that provided by one or more AND gates, OR gates, registers, inverters, and logic functions. For example, a buffer may be constructed from two inverters coupled back-to-back. In one aspect of the disclosed approach, in accordance with typical integrated circuit design and manufacturing techniques, standard cells may be used in the creation of any desired function.

Different Voltages

Semiconductor apparatuses, as disclosed herein, may include integrated circuits or semiconductor devices that can be supplied with more than one power domain. These semiconductor apparatuses are said to have more than one power domain, where each power domain is associated with the voltage level provided by its associated voltage net. In some aspects of the disclosed approach, saving power on the apparatus containing the integrated circuit or semiconductor device is desired.

Figure 2B:
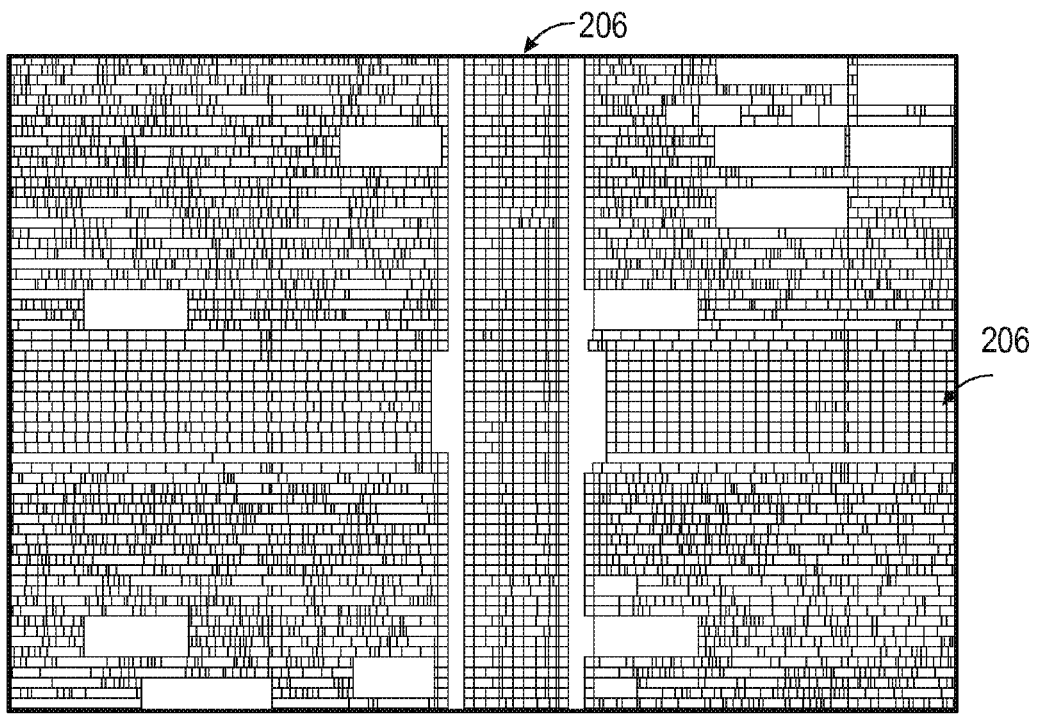
FIG. 2B illustrates a close up view of detail 2B of FIG. 2A.

In one aspect of the disclosed approach, the semiconductor apparatus includes multiple (e.g., eight (8)) metal layers. Voltage pathways 206 may be pre-defined on a surface 200 of a semiconductor material and electrically connected to the second power domain. FIG. 2B, below, illustrates a close up view of two of the voltage pathways 206. According to one aspect of the disclosed approach, the voltage pathways 206 may be pre-defined and grouped in a pattern. Furthermore, the patterns may have geometric configurations, such as a checkerboard form as shown by the black squares in FIG. 2A. One or more circuits, such as buffers or repeaters, may be implemented in the voltage pathways 206. The one or more circuits may be constructed of two inverters integrally connected back to back. A signal on a network of conductive material (i.e., wire) may be received by a buffer located in a voltage pathway, regenerated by the buffer and then sent on. Although the present approach is described with buffers being placed within the voltage pathways, this is by way of example only and other circuits may be placed within the voltage pathways. For example, other circuits such as flip-flops, adders, or other logic gates may be placed within and supported by the voltage pathways.

Unlike typical integrated circuit design processes where the placement of buffers may be in areas where other devices operating at another voltage are located in order to support a network of conductive materials, various aspects of the disclosed approach allow for a routing of the network of conductive material first, and then placing the buffers at intersections between: (1) the network of conductive material; and (2) a voltage pathway such as voltage pathways 206, where buffering is needed. This provides for the network of conductive material to be determined not only based on the shortest time to get from Point A to Point B, but through signal traffic on the semiconductor apparatus. Consequently, if an area on the semiconductor apparatus is congested, the network of conductive material can be routed around the congestion. As such, although the network of conductive material determined across the chip is not a direct route, it will be of a distance to support a speed at which the signal needs to be transferred.

During the design process of the semiconductor apparatus, space on the surface of the semiconductor material may be reserved, or set aside, for the voltage pathways 206. This is not typically done as it takes away from the useable space. However, although useable space is taken away, the networks of conductive material and thus the signal will be able to cross through the voltage pathways 206 and buffers may be placed on the voltage pathways 206 where needed. According to one aspect of the disclosed approach, the distance between the buffers may be pre-calculated. Furthermore, the network of conductive material for transporting the signals may traverse any part of the circuit but the buffers can only be placed within the voltage pathways.

Buffering Scheme

Figure 3:
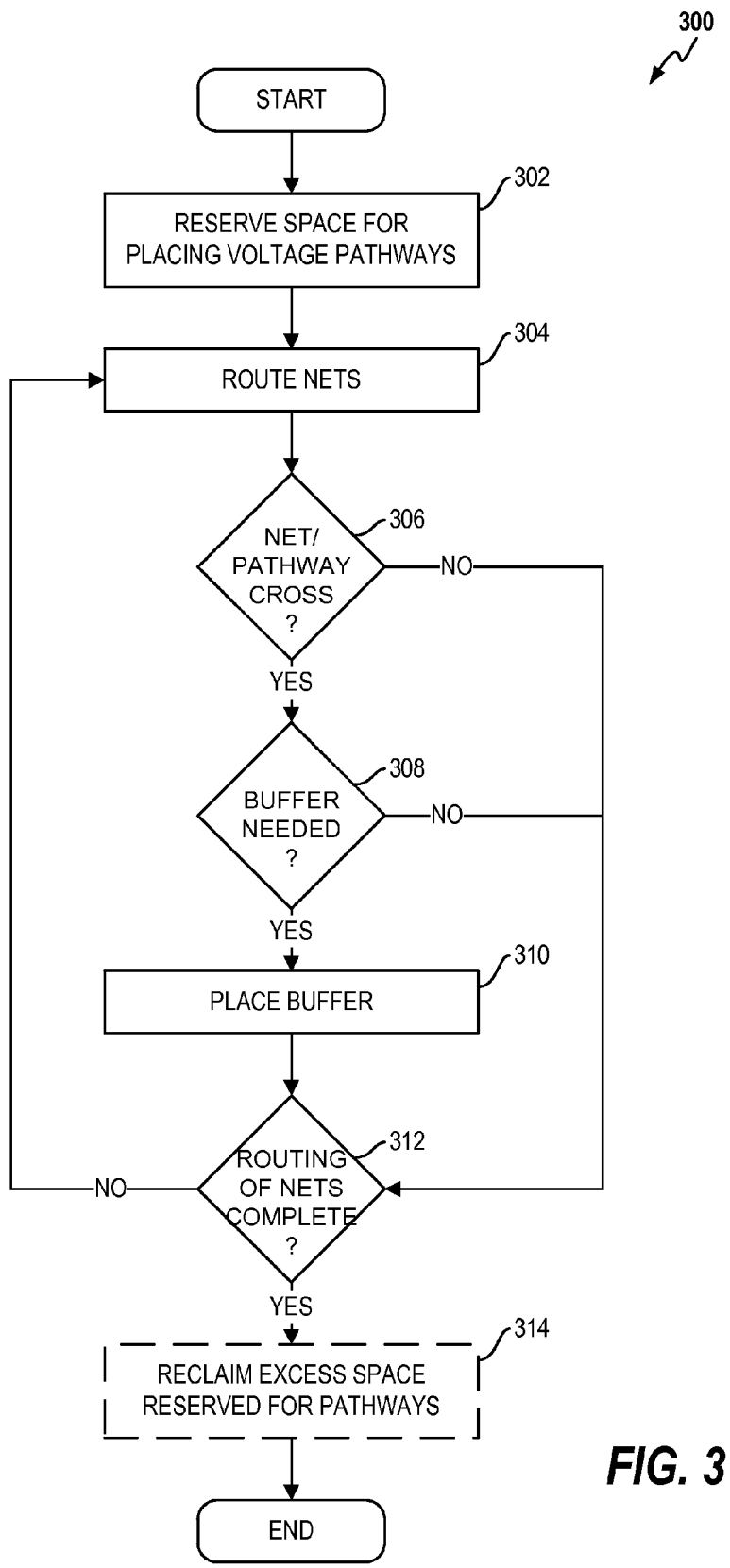
FIG. 3 illustrates a congestion aware buffering process configured for multi-power domain configurations in accordance with one aspect of the disclosed approach.

During the design and layout process, space is reserved or set aside, in the form of a voltage pathway, in an area on a surface of a semiconductor device associated with a first power domain. The voltage pathways are associated with a second power domain and are reserved for placing buffers to strengthen signals that are also associated with the second power domain traversing these first power domain areas on a particular net. In accordance with various aspects of the disclosed approach, congestion aware buffering process 300 configured for multi-power domain configurations is illustrated in FIG. 3 where, at 302, space for a plurality of voltage pathways is reserved.

At 304, a net associated with a second power domain may be routed across the semiconductor material after the voltage pathways have been reserved.

In one aspect of the disclosed approach, after the process of routing the net associated with the second power domain, a determination is made if a particular net crosses through a voltage pathway at 306. The net may be routed but not buffers have yet been placed. Because buffers of the second power domain are limited to placement on a voltage pathway, a crossing provides an opportunity to place a buffer. That is, as the net associated with a second power domain is routed, buffers may be placed where needed at the intersection of the route and the voltage pathway.

At 308, after the routing of the net associated with a second power domain has been determined to cross through a voltage pathway, a determination is made as to whether a buffer is needed at the crossing of the net associated with a second power domain and the voltage pathway to regenerate (or strengthen) the signal before the signal is sent on. In one aspect of the disclosed approach, a decision is made every time the net crosses a voltage pathway. That is, if the net has a first crossing (i.e., where the network of conductive material crosses a first voltage pathway), then a decision is made as to whether a buffer is needed at the first crossing. Further, if the net has a second crossing; then a decision is made as to whether a buffer is needed at the second crossing, etc. If a determination is made that a buffer is needed, a buffer may be placed in the voltage pathway for that crossing. Otherwise, operation continues at 312.

At 310, after it has been determined that a buffer is to be placed at a crossing, the buffer is positioned at the crossing. In one aspect of the disclosed approach, the buffers are powered by the second power domain of the voltage pathway while the arrangement of semiconductor devices, which have been divided into one or more groups by the voltage pathways, may be powered by another power domain.

At 312, it may be determined if routing of the nets is complete. For example, after a buffer is placed at 310, it may be determined if the use of the buffer allows the signal to be propagated to the end of the net with an acceptable level of degradation. In another example, if no buffer is placed, then it is determined if a further routing is needed after the crossing. If further routing is needed, then operation continues at 304. On completion of buffer placements, appropriate connections are established.

At 314, in one aspect of the disclosed approach, after it is determined that routing is completed; any space that has been reserved for voltage pathways but is unused may be reclaimed for other purposes. For example, in one aspect of the disclosed approach, after all buffers have been placed, any unused portions of the voltage pathways may be reclaimed for the arrangement of semiconductor devices (e.g., including devices belonging to the first power domain) during the design process.

In another aspect of the disclosed approach, no space is reclaimed.

Once the design and layout has been determined, the semiconductor apparatus may be manufactured. The manufacturing process includes forming semiconductor devices on a surface of a semiconductor material; and depositing networks of conductive material in a pattern onto the semiconductor material to form nets electrically connecting the semiconductor devices. As discussed, the formation of the semiconductor devices includes forming one or more circuits (such as the aforementioned buffers) to connect to selected networks of conductive material to strengthen signals on these nets that are layered on top of the semiconductor devices.

Figure 4:
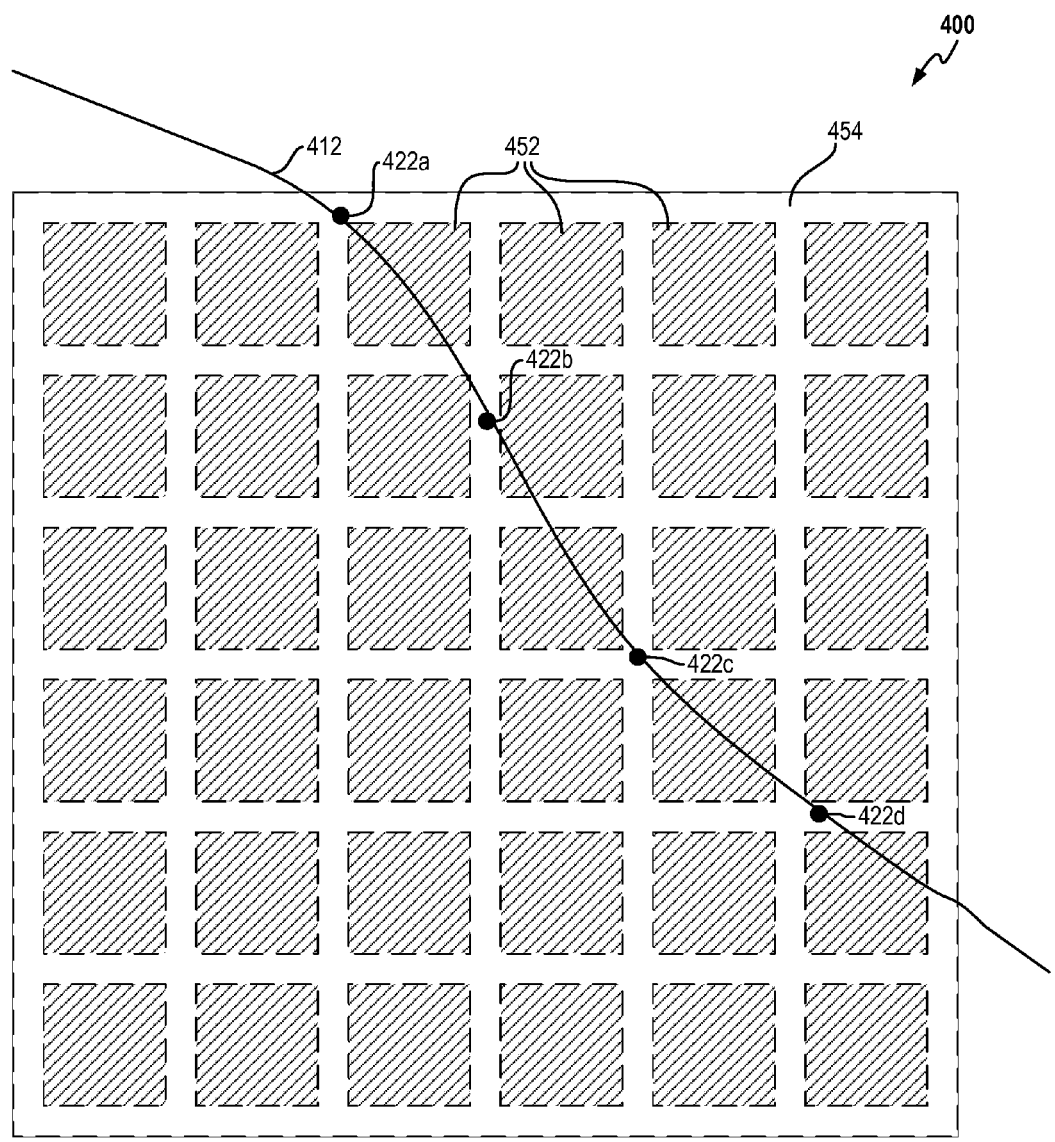
FIG. 4 illustrates a top view of a surface of semiconductor material in a semiconductor apparatus showing signal and buffer placement in accordance with one aspect of the disclosed approach.

FIG. 4 illustrates a top view of a surface of semiconductor material in a semiconductor apparatus 400 showing signal and buffer placement in accordance with one aspect of the disclosed approach. As shown, a signal line or net may cross the surface of the semiconductor material that is comprised of a plurality of first power domain areas 452 and a plurality of second power domain areas 454. The plurality of first power domain areas 452 are portions of the surface of the semiconductor material associated with a first power domain, i.e. areas comprising devices powered by a first voltage level (e.g. video core devices). The plurality of second power domain areas 454 are pathways associated with a second power domain, i.e., areas in which buffers may be placed to buffer a signal belonging to a second, different power domain. In other words, the nets and thus the signal will be able to cross through the voltage pathways 454 and buffers 422*a-d* may be placed on the voltage pathways 454 where needed. According to one aspect of the disclosed approach, the distance between the buffers 422*a-d* may be pre-calculated. The distance may be pre-calculated so that the voltage pathways may be spaced at regular intervals providing a consistent distance between the pathways. Additionally, the distances may be pre-calculated prior to manufacturing so that the distances between the buffers never exceed a pre-determined threshold, however, the distances between buffers may depend on the route which can cause inconsistent distances unless the route is a straight horizontal or vertical line. Furthermore, the nets for transporting the signals may traverse any part of the circuit but the buffers 422*a-d* can only be placed within the voltage pathways.

Figure 5:
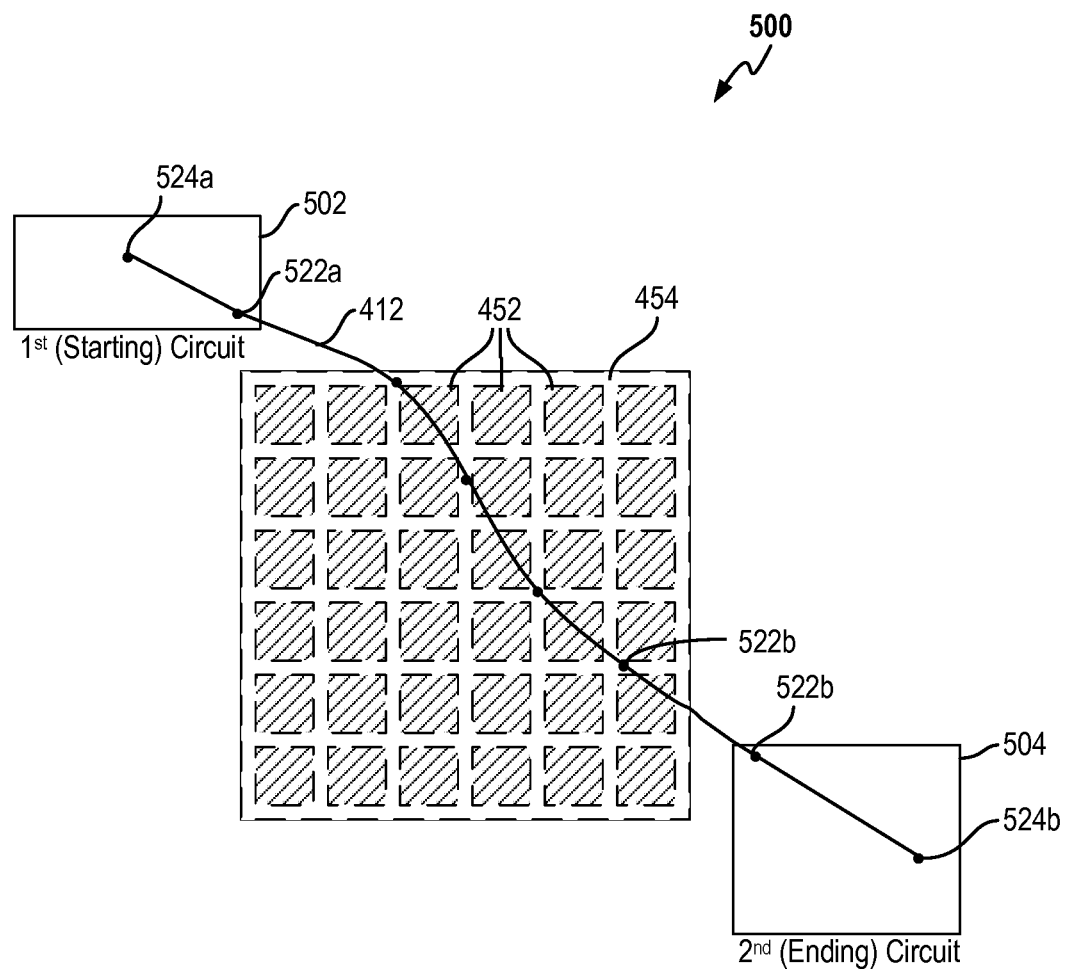
FIG. 5 illustrates a signal line in FIG. 4 connected to a first (starting point) circuit and a second (ending point) circuit in accordance with one aspect of the disclosed approach.

FIG. 5 illustrates the signal line or net 412 of FIG. 4 connected to a first (starting point) circuit 502 and a second (ending point) circuit 504. As shown, the signal line or net 412 may cross the semiconductor material and have a first end 524*a* connected to the first circuit 502 and a second end 524*b* connected to the second circuit 504. The first circuit 502 and the second circuit 504 are associated with the second power domain. One or more circuits 522*a-b*, such as buffers or repeaters, may be implemented in the first and second circuits 502, 504. For example, the one or more circuits 522*a-b* may be constructed of two inverters integrally connected back-to-back. The signal line or net 412 may be received by a buffer located in the first or second circuits 502, 504, regenerated by the buffer and then sent on through one or more of the buffers placed in second power domain areas 402. As such, although the nets belonging to the first circuit 502 and the second circuit 504 (second power domain) may pass through the first power domain 452; the nets may be buffered in the voltage pathways 454, i.e. the second domain areas.

Figure 6:
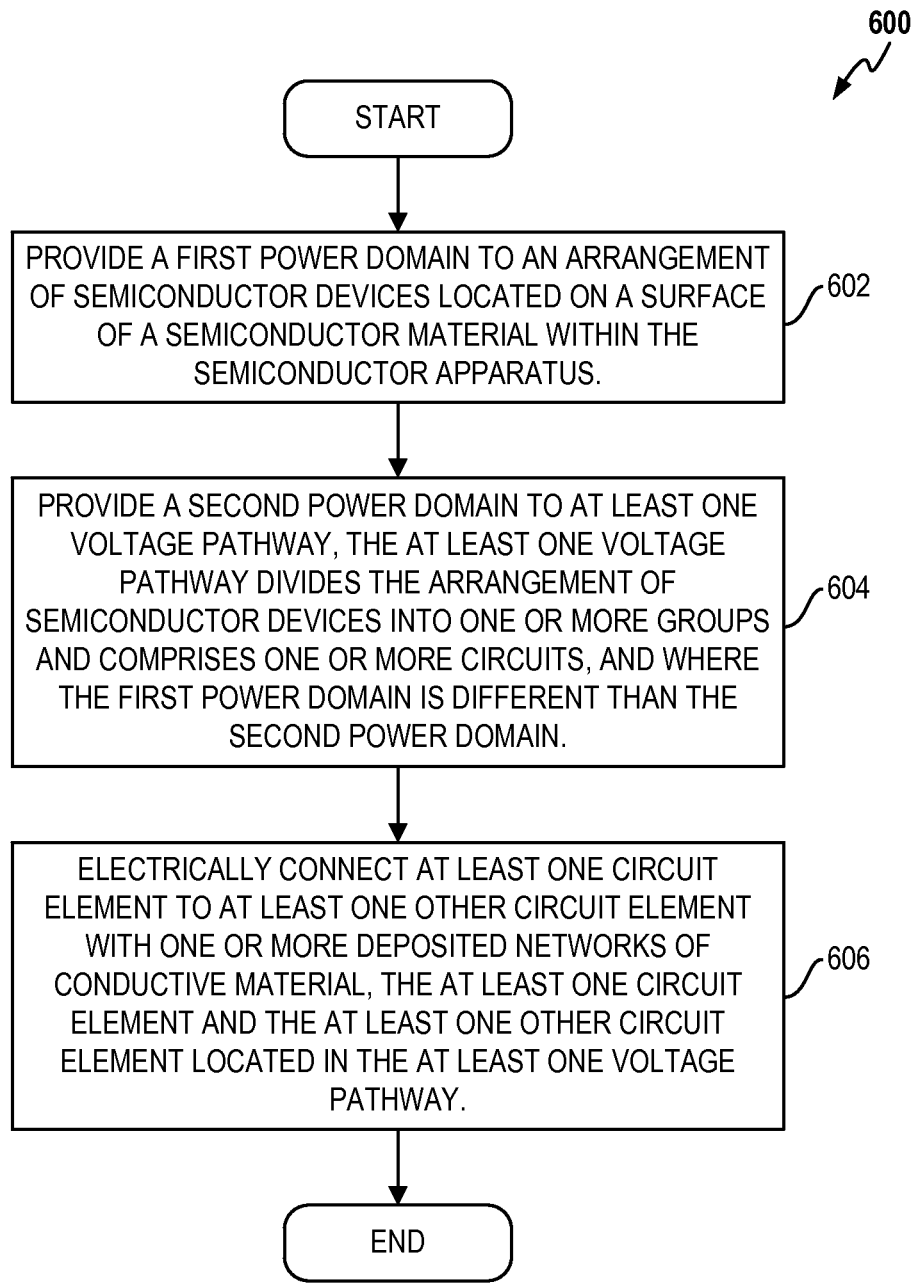
FIG. 6 illustrates a method for buffering signals in a semiconductor apparatus using voltage isolation.

In accordance with various aspects of the disclosed approach, a method 600 for buffering signals in a semiconductor apparatus using voltage isolation is illustrated in FIG. 6 where, at 602, a first power domain is provided to an arrangement of semiconductor devices located on a surface of a semiconductor material within the semiconductor apparatus.

At 604, a second power domain is provided to a voltage pathway. The voltage pathway comprises one or more circuits and divides the arrangement of semiconductor devices into one or more groups. In one aspect, the first power domain may be different from and independent of the second power domain. For example, each of the power domains may have different voltages and/or each of the power domains can be turned on and off independently (i.e., turning one domain off or to a lower voltage doesn't affect the voltage of the other domain).

The one or more circuits may comprise a set of buffers in a pre-defined pattern. The pre-defined pattern may comprise a geometric configuration, such as a checkerboard pattern. In one aspect, the one or more circuits may be located at an intersection of the one or more deposited networks of conductive material and the voltage pathway.

At 606, at least one circuit element is electrically connected to at least one other circuit element with one or more deposited networks of conductive material. The at least one circuit element and the at least one other circuit element located in the voltage pathway. The one or more deposited networks of conductive material may traverse any portion of the surface of the semiconductor material while the one or more circuits are only located in the at least one voltage pathway.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosed approach described herein can be implemented in different systems without departing from the novel aspects of the disclosed approach. It should be noted that the foregoing embodiments are merely examples and are not to be construed as limiting the disclosed approach. The description of the embodiments is intended to be illustrative, and not to limit the scope of the claims. As such, the present teachings can be readily applied to other types of apparatuses and many alternatives, modifications, and variations will be apparent to those skilled in the art.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A semiconductor apparatus, comprising:
    an arrangement of semiconductor devices located on a surface of semiconductor material, where each semiconductor device in the arrangement of semiconductor devices is associated with a first power domain;
    at least one voltage pathway defined on the surface of the semiconductor material that divides the arrangement of semiconductor devices into one or more groups, where the at least one voltage pathway comprises one or more areas reserved on the surface for placement of one or more circuits associated with a second power domain that is different than the first power domain; and
    one or more deposited networks of conductive material configured to electrically connect at least one circuit element to at least one other circuit element, the at least one circuit element located in a first voltage pathway of the at least one voltage pathway and the at least one other circuit element located in a second voltage pathway in the at least one voltage pathway.

2. The semiconductor apparatus of claim 1, wherein the one or more circuits comprise a set of buffers.

3. The semiconductor apparatus of claim 1, wherein the location of the at least one voltage pathway is pre-defined during placement of the one or more circuits of the second power domain.

4. The semiconductor apparatus of claim 1, wherein the first power domain is independent of the second power domain.

5. The semiconductor apparatus of claim 1, wherein the one or more areas of the at least one voltage pathway that are reserved on the surface for placement of the one or more circuits associated with the second power domain comprises a pre-defined pattern.

6. The semiconductor apparatus of claim 5, wherein the pre-defined pattern comprises a geometric configuration.

7. The semiconductor apparatus of claim 6, wherein the geometric configuration comprises a checkerboard pattern.

8. The semiconductor apparatus of claim 1, wherein the one or more deposited networks of conductive material may traverse any portion of the surface of the semiconductor material while the one or more circuits are only located in the at least one voltage pathway.

9. The semiconductor apparatus of claim 1, wherein the arrangement of semiconductor devices may be located on any unused areas of the at least one voltage pathway.

10. The semiconductor apparatus of claim 1, wherein the one or more circuits are located at an intersection of the one or more deposited networks of conductive material and the at least one voltage pathway.

11. The semiconductor apparatus of claim 1, wherein the first voltage pathway is different than the second voltage pathway.

12. A method for buffering signals in a semiconductor apparatus using voltage isolation, comprising:
    providing a first power domain to an arrangement of semiconductor devices located on a surface of a semiconductor material within the semiconductor apparatus;
    providing a second power domain to at least one voltage pathway, the at least one voltage pathway dividing the arrangement of semiconductor devices into one or more groups and comprising one or more circuits, and where the first power domain is different than the second power domain; and
    electrically connecting at least one circuit element to at least one other circuit element with one or more deposited networks of conductive material, the at least one circuit element located in a first voltage pathway of the at least one voltage pathway and the at least one other circuit element located in a second voltage pathway in the at least one voltage pathway.

13. The method of claim 12, wherein the one or more circuits comprises a set of buffers.

14. The method of claim 12, wherein the first power domain is independent of the second power domain.

15. The method of claim 12, wherein the one or more circuits associated with the second power domain comprises a pre-defined pattern.

16. The method of claim 15, wherein the pre-defined pattern comprises a geometric configuration.

17. The method of claim 16, wherein the geometric configuration comprises a checkerboard pattern.

18. The method of claim 12, wherein the one or more deposited networks of conductive material may traverse any portion of the surface of the semiconductor material while the one or more circuits are only located in the at least one voltage pathway.

19. The method of claim 12, wherein the one or more circuits are located at an intersection of the one or more deposited networks of conductive material and the at least one voltage pathway.

20. The method of claim 12, wherein the first voltage pathway is different than the second voltage pathway.

21. A semiconductor apparatus, comprising:
    means for providing a first power domain to an arrangement of semiconductor devices located on a surface of a semiconductor material within the semiconductor apparatus;
    means for providing a second power domain to at least one voltage pathway, the at least one voltage pathway divides the arrangement of semiconductor devices into one or more groups and comprises one or more circuits, and where the first power domain is different than the second power domain; and
    means for electrically connecting at least one circuit element to at least one other circuit element with one or more deposited networks of conductive material, the at least one circuit element located in a first voltage pathway of the at least one voltage pathway and the at least one other circuit element located in a second voltage pathway in the at least one voltage pathway.

22. The semiconductor apparatus of claim 21, wherein the one or more circuits comprises a set of buffers.

23. The semiconductor apparatus of claim 21, wherein the first power domain is independent of the second power domain.

24. The semiconductor apparatus of claim 21, wherein the one or more circuits associated with the second power domain comprises a pre-defined pattern.

25. The semiconductor apparatus of claim 24, wherein the pre-defined pattern comprises a geometric configuration.

26. The semiconductor apparatus of claim 25, wherein the geometric configuration comprises a checkerboard pattern.

27. The semiconductor apparatus of claim 21, wherein the one or more deposited networks of conductive material may traverse any portion of the surface of the semiconductor material while the one or more circuits are only located in the at least one voltage pathway.

28. The semiconductor apparatus of claim 21, wherein the one or more circuits are located at an intersection of the one or more deposited networks of conductive material and the at least one voltage pathway.

29. A method for buffering signals in a semiconductor apparatus using voltage isolation, comprising:
- arranging an arrangement of semiconductor devices on a surface of a semiconductor material within the semiconductor apparatus, where each semiconductor device in the arrangement of semiconductor devices is configured to perform a particular function;
- determining placement of at least one voltage pathway on the surface of the semiconductor material that divides the arrangement of semiconductor devices into one or more groups, where the at least one voltage pathway comprises one or more areas reserved on the surface for placement of one or more circuits;
- routing one or more networks of conductive material configured to electrically connect at least one circuit element to at least one other circuit element, the at least one circuit element and the at least one other circuit element located in the one or more groups;
- determining placement of the one or more circuits on the at least one voltage pathway;
- connecting the one or more groups to a first power domain; and
- connecting the at least one voltage pathway to a second power domain, where the second power domain is different than the first power domain.

30. The method of claim 29, wherein determining the placement of the one or more circuits on the at least one voltage pathway comprises:
- determining locations where the one or more networks of conductive material intersect over the at least one voltage pathway;
- determining if a signal strength at the locations of intersection are degrading; and
- placing the one or more circuits at any of the locations of intersection where the signal strength is degrading.

31. The method of claim 30, wherein the one or more circuits are buffers.

* * * * *